Patented Mar. 18, 1941

2,235,478

UNITED STATES PATENT OFFICE 2,235,478

AZO DYESTUFF CONTAINING THE ARSENO GROUP AND PROCESS FOR THE MANUFACTURE OF SAME

Ernst Albert Hermann Friedheim, Geneva, Switzerland

No Drawing. Application March 21, 1940, Serial No. 325,231. In Switzerland April 26, 1939

2 Claims. (Cl. 260—143)

In German patent specification No. 271,271 is described a process for the manufacture of azo dyestuffs containing the arseno group which are to be employed therapeutically. The azo dyestuffs mentioned in the examples are synthesised by the use of diazotised arsanilic acid and 4-hydroxy-3-amino-phenyl-1-arsonic acid on the one hand and phloroglucinol, 2-naphthylamine-3,6-disulphonic acid, 1-amino-8-naphthol-3,6-disulphonic acid on the other hand.

On checking the therapeutic action of the products prepared in accordance with the examples of German patent specification No. 271,271 it was found that, on the one hand, these arseno compounds are comparatively toxic and, on the other hand, they have little or no curative effect on trypanosoma infection (T. equiperdum) in the mouse. In the most favourable cases these products are capable of curing with the highest tolerated dose, i. e., the index is 1:1 in the most favourable cases.

It has now been found that the azo dyestuff of the following constitution

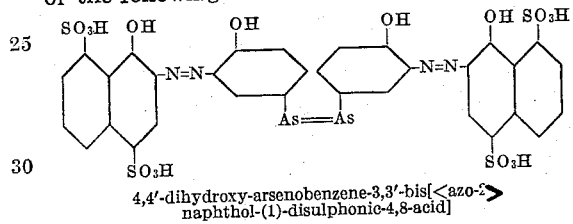

4,4'-dihydroxy-arsenobenzene-3,3'-bis[<azo-2> naphthol-(1)-disulphonic-4,8-acid]

has a very high activity and a comparatively low toxicity: In an advanced equiperdum infection in the mouse a lasting cure without relapse is obtained with a single intraperitoneal dose of 0.01 gram per kilogram of mouse, whereas 0.3 gram per kilogram of mouse can be tolerated without any adverse effect. By way of comparison it may be mentioned that under the same conditions the dosis minima curativa in the case of Neosalvarsan is also 0.01 gram, the dosis maxima tolerata however only 0.15 gram ker kilogram of mouse. Whereas the therapeutic index in respect of Neosalvarsan thus amounts to 1:15, it is at least 1:30 for the product obtained in accordance with the present invention. The tolerance and the therapeutic margin of the new product is accordingly twice that of Neosalvarsan.

Compared with Salvarsan preparations the product of the present invention has a further practical advantage of importance in that it is stable to air.

Example 1 part by weight of the red azo dyestuff obtained by coupling diazotised 4-hydroxy-3-aminophenyl-1-arsonic acid with 1-naphthol-4,8-disulphonic acid is dissolved in 10 parts by weight of hot water. To the red solution are added 5 parts by weight of a solution prepared as follows: 6 parts by weight of sodium hypophosphite, 2 parts by weight of water, 10 parts by weight of hydrochloric acid (S. G. 1.19) and 40 parts by weight of methanol are mixed and 0.5 part by volume of 48 per cent hydriodic acid added to the filtered solution.

The warm reaction mixture turns blue-violet on standing, and the arseno compound formed separates in the form of a dark violet powder which is filtered off and washed with methanol.

The product is soluble in bicarbonate solution giving a red-violet colour which, on addition of alkali, takes a bluish tinge. It is again precipitated unchanged from the alkaline solution by hydrochloric acid.

I claim:
1. The 4,4'-dihydroxy - arsenobenzene-3,3'-bis [<azo-2>naphthol-(1)-disulphonic-4,8-acid].

2. Process for the manufacture of 4,4'-dihydroxy-arsenobenzene-3,3'- bis[<azo-2>naphthol-(1)-disulphonic-4,8-acid], comprising reducing the azo dyestuff obtained from diazotised 4-hydroxy-3-aminophenyl-1-arsonic acid and 1-naphthol-4,8-disulphonic acid, with hypophosphorous acid in presence of hydriodic acid.

ERNST ALBERT HERMANN FRIEDHEIM.